US012451006B2

(12) United States Patent
Son

(10) Patent No.: US 12,451,006 B2
(45) Date of Patent: Oct. 21, 2025

(54) TRAFFIC SIGNAL CONTROL DEVICE

(71) Applicant: Seung-Hee Son, Seoul (KR)

(72) Inventor: Seung-Hee Son, Seoul (KR)

( * ) Notice: Subject to any disclaimer, the term of this patent is extended or adjusted under 35 U.S.C. 154(b) by 58 days.

(21) Appl. No.: 18/290,376

(22) PCT Filed: May 12, 2022

(86) PCT No.: PCT/KR2022/006830
§ 371 (c)(1),
(2) Date: Nov. 13, 2023

(87) PCT Pub. No.: WO2022/240215
PCT Pub. Date: Nov. 17, 2022

(65) Prior Publication Data

US 2024/0249617 A1 Jul. 25, 2024

(30) Foreign Application Priority Data

May 14, 2021 (KR) ........................ 10-2021-0062885
Jul. 12, 2021 (KR) ........................ 10-2021-0091058

(51) Int. Cl.
*G08G 1/087* (2006.01)
*G08G 1/005* (2006.01)
*G08G 1/16* (2006.01)

(52) U.S. Cl.
CPC ............. *G08G 1/087* (2013.01); *G08G 1/005* (2013.01); *G08G 1/166* (2013.01)

(58) Field of Classification Search
CPC . G01S 17/89; G08G 1/01; G08G 1/04; G08G 1/07; G08G 1/09; G08G 1/095; G08G 1/0965; H04N 7/18
See application file for complete search history.

(56) References Cited

U.S. PATENT DOCUMENTS

| | | | | |
|---|---|---|---|---|
| 4,775,865 A * | 10/1988 | Smith | G08G 1/087 340/906 |
| 2005/0104745 A1 * | 5/2005 | Bachelder | G08G 1/01 340/988 |
| 2008/0316055 A1 * | 12/2008 | Bachelder | G08G 1/095 340/906 |

FOREIGN PATENT DOCUMENTS

| | | |
|---|---|---|
| JP | 2004-295244 A | 10/2004 |
| KR | 10-2008-0109169 A | 12/2008 |
| KR | 20-2011-0004929 U | 5/2011 |
| KR | 10-2016-0066214 A | 6/2016 |
| KR | 10-2018-0059663 A | 6/2018 |
| KR | 10-2020-0009840 A | 1/2020 |

(Continued)

OTHER PUBLICATIONS

International Search Report for PCT/KR2022/006830 mailed on Oct. 25, 2022.

*Primary Examiner* — Sisay Yacob
(74) *Attorney, Agent, or Firm* — The PL Law Group, PLLC

(57) ABSTRACT

A traffic signal control device according to an embodiment may include a location determination unit for determining a location of an emergency vehicle, and a traffic light management unit which causes a pedestrian traffic light in the vicinity of the emergency vehicle to output no-crossing information on a region displaying no-crossing information of the pedestrian traffic light, and transmits, to a traffic light controller, a traffic signal control command that causes information indicating an emergency situation related to the emergency vehicle to be outputted to a region surrounding the region displaying the no-crossing information.

5 Claims, 11 Drawing Sheets

(56) References Cited

FOREIGN PATENT DOCUMENTS

| | | | |
|---|---|---|---|
| KR | 10-2202150 | B1 | 1/2021 |
| WO | WO 2006/059839 | A1 | 6/2006 |

* cited by examiner

TRAFFIC SIGNAL CONTROL DEVICE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/006830 filed on May 12, 2022, which claims priority to the benefit of Korean Patent Application Nos. 10-2021-0062885 filed on May 14, 2021 and 10-2021-0091058 filed on Jul. 12, 2021 in the Korean Intellectual Property Office, the entire contents of which are incorporated herein by reference.

BACKGROUND

1. Technical Field

The present disclosure relates to a traffic signal control device, and more particularly, to a traffic signal control device for providing an output method of information indicating an emergency situation to a pedestrian traffic light near an emergency vehicle.

Additionally, the present disclosure relates to an electronic device, and more particularly, to an electronic device for identifying a danger area in the vicinity of the electronic device based on the color of a light source and the type of a detected object to identify the danger area accurately and quickly and output accurate alarm information to the object entering the danger area.

Additionally, the present disclosure relates to an autonomous vehicle, and more particularly, to an autonomous vehicle for diagnosing a myocardial infarction in an occupant and controlling the autonomous vehicle to self-drive to a hospital.

2. Background Art

In general, when an emergency situation occurs, an emergency vehicle moves to a location at which the emergency situation occurred.

In this instance, the emergency vehicle is supposed to drive on the road as fast as possible, and accordingly pedestrian traffic lights should stay red on the path along which the emergency vehicle passes.

However, in general, in the case where the traffic signals are still red after the emergency vehicle passed, nearby pedestrians may be confused and not aware of the situation, or may ignore the traffic signal and walk across the crosswalk.

Therefore, there is a need for a system for notifying the nearby pedestrians of the situation in which the emergency vehicle will pass.

SUMMARY

The present disclosure is designed to meet the above-described need, and therefore the present disclosure is directed to providing a pedestrian with information indicating an emergency situation in a complex and noisy traffic situation to allow the pedestrian to clearly determine and handle the emergency situation, thereby achieving more safe traffic system management.

The present disclosure is further directed to providing a method for accurately identifying an object located in the vicinity of a traffic light on the road and easily providing warning information to the object entering a danger area by using the traffic light improved to be smart without the help of any other device or server.

The present disclosure is further directed to providing a method for enabling an autonomous vehicle to transport an occupant to a hospital quickly to save the life of the occupant when a myocardial infarction happens. In particular, the present disclosure is directed to further improving the precision in diagnosis of myocardial infarction in the occupant in the environment of the vehicle traveling on the road.

A traffic signal control device according to an embodiment may include a location determination unit to determine a location of an emergency vehicle; and a traffic light management unit to transmit a traffic signal control command to a traffic light controller, wherein the traffic signal control command controls the output of Don't walk information to a region displaying the Don't walk information in a pedestrian traffic light near the emergency vehicle and information indicating an emergency situation related to the emergency vehicle to a region surrounding the region displaying the Don't walk information.

A traffic signal control device according to an embodiment may include a location determination unit to determine a location of an emergency vehicle; and a signal control unit to transmit a traffic signal control command to a traffic light controller, wherein the traffic signal control command controls the output of Don't walk information and information indicating an emergency situation related to the emergency vehicle together, overlapping each other, to a region displaying the Don't walk information in a pedestrian traffic light near the emergency vehicle.

A traffic signal control device according to an embodiment may include a location determination unit to determine a location of an emergency vehicle; and a signal control unit to transmit a traffic signal control command to a traffic light controller, wherein the traffic signal control command controls the output of Don't walk information to a first region of a region displaying the Don't walk information and information indicating an emergency situation related to the emergency vehicle to a second region of the region displaying the Don't walk information in a pedestrian traffic light near the emergency vehicle.

A traffic signal control device according to an embodiment may include a location determination unit to determine a location of an emergency vehicle; and a signal control unit to transmit a traffic signal control command to a traffic light controller, wherein the traffic signal control command controls the output of information indicating an emergency situation related to the emergency vehicle, rather than Don't walk information, to a region displaying the Don't walk information in a pedestrian traffic light near the emergency vehicle.

A traffic signal control device according to an embodiment may include a location determination unit to determine a location of an emergency vehicle; and a signal control unit to transmit a traffic signal control command to a traffic light controller, wherein the traffic signal control command controls the output of Don't walk information to a region displaying the Don't walk information in a pedestrian traffic light near the emergency vehicle and information indicating an emergency situation related to the emergency vehicle to a region displaying Walk information in the pedestrian traffic light.

A traffic signal control device according to an embodiment may include a location determination unit to determine a location of an emergency vehicle; and a signal control unit to transmit a traffic signal control command to a traffic light controller, wherein the traffic signal control command controls the output of information indicating an emergency situation related to the emergency vehicle to each of a region displaying Don't walk information and a region displaying Walk information in a pedestrian traffic light near the emergency vehicle.

The traffic light management unit may transmit the traffic signal control command to the traffic light controller, wherein the traffic signal control command controls the output of the information indicating the emergency situation reflecting information associated with an urgency level of the emergency vehicle.

The information indicating the emergency situation may be at least one of occurrence notification information of the emergency situation, a type of the emergency vehicle, a speed, a movement direction or a waiting time of the emergency vehicle.

The information indicating the emergency situation may be outputted in at least one form of a flash, an icon or a text.

The traffic signal control command may control the output of audio information together.

The traffic signal control device may further include a terminal management unit to transmit the traffic signal control command to a terminal near the pedestrian traffic light.

An electronic device according to an embodiment may include a light source; an object detection unit to detect a first object present in an area near the electronic device; an alarm unit to output alarm information; and a control unit to identify a color of the flashing light source and the detected first object, change and recognize a danger area from an area of an image corresponding to the area near the electronic device based on identification information, and control the alarm unit to output the alarm information in response to a second object being determined to have entered the danger area, wherein the second object is different from the first object.

The object detection unit may include at least one of a LIDAR sensor or a camera, wherein the camera acquires the image, and the control unit may change and recognize the danger area from the area of the image corresponding to the area near the electronic device using at least one of point map data acquired from the LiDAR sensor or the image.

The control unit may change and recognize a crosswalk area as the danger area in response to the color of the flashing light source being green and the first object present in the area near the electronic device recognized from the image being a human.

The control unit may change and recognize the danger area based on a remaining time available for the human to cross.

The control unit may change and recognize a portion of at least one of a crosswalk area or a driveway area as the danger area in response to the color of the flashing light source being green and the first object present in the area near the electronic device recognized from the image being a vehicle, The control unit may change and recognize the danger area based on a lane on which the vehicle drives.

The control unit may change and recognize at least one of size, number or location of the danger area.

The control unit may control the alarm unit to output the alarm information of different types according to a type of the first object.

The control unit may provide the alarm information to a peripheral device.

An autonomous vehicle according to an embodiment may include a camera to photograph an occupant to generate an occupant image; and a control unit to, in response to determination that the occupant image represents the occupant grabbing a chest of the occupant with a hand of the occupant, and at the same time, a degree of facial contortion of the occupant is larger than a predetermined threshold, and an upper body of the occupant leans at a predetermined angle or more, diagnose the occupant with a myocardial infarction and control the autonomous vehicle to self-drive to a hospital.

The control unit may perform inference to output myocardial infarction diagnosis information from the occupant image using a myocardial infarction analysis model, and the myocardial infarction analysis model may be generated by deep learning that outputs the myocardial infarction diagnosis information from the occupant image using Convolutional Neural Networks (CNN).

The control unit may further diagnose a severity of the myocardial infarction based on at least one of whether the occupant grabs the chest of the occupant with one hand or both hands, the degree of facial contortion of the occupant, or the extent to which the upper body of the occupant leans at the predetermined angle or more.

The control unit may control the autonomous vehicle to self-drive to the optimal hospital among hospitals specializing in myocardial infarction, hospitals having available beds and hospitals closest to a current location based on a diagnosis result of the severity of the myocardial infarction.

The autonomous vehicle may further include a storage unit; and a sound sensing unit to sense a sound of the occupant, and the control unit may control the autonomous vehicle to self-drive to the hospital with further reference to a matching ratio between a sensing result of the sound of the occupant and a single-syllable moan sound pre-stored in the storage unit.

An autonomous vehicle according to an embodiment may include a seat belt having a heartbeat sensor embedded at a location corresponding to a chest location of an occupant to measure heat beats of the occupant; a seat having a pressure sensor embedded therein to measure a body pressure of the occupant; and a control unit to diagnose the occupant with a myocardial infarction using a measurement result of the heart beats and a measurement result of the body pressure together, and control the autonomous vehicle to self-drive to a hospital.

The control unit may control the heartbeat sensor to operate in response to determination that the occupant leans to one side based on the measurement result of the body pressure.

A portion of the seat belt corresponding to the chest location of the occupant may be made of a conductive material.

An autonomous vehicle according to an embodiment may include a seat belt having a motion sensor embedded therein to measure a motion level of an occupant, the motion sensor including an acceleration sensor and a gyro sensor; a seat having a pressure sensor embedded therein to measure a body pressure of the occupant; and a control unit to diagnose the occupant with a myocardial infarction using a measurement result of the motion level and a measurement result of the body pressure together, and control the autonomous vehicle to self-drive to a hospital.

An autonomous vehicle according to an embodiment may include a seat belt having a motion sensor embedded therein to measure a motion level of an occupant, the motion sensor including an acceleration sensor and a gyro sensor; a radar sensor to emit electromagnetic waves towards a chest of the occupant and measure the electromagnetic waves reflected from the occupant; and a control unit to diagnose the occupant with a myocardial infarction using a measurement result of the motion level and a measurement result of the electromagnetic waves together, and control the autonomous vehicle to self-drive to a hospital.

The control unit may control the radar sensor to operate in response to determination that the motion level of the occupant is equal to or larger than a predetermined threshold based on the measurement result of the motion level.

The control unit may control the autonomous vehicle to self-drive to the hospital having available beds.

The control unit may control the autonomous vehicle to self-drive to the hospital selected by another occupant among hospitals specializing in myocardial infarction, hospitals having available beds and hospitals closest to a current location.

The control unit may further diagnose a severity of the myocardial infarction, and control the autonomous vehicle to self-drive to the optimal hospital among hospitals specializing in myocardial infarction, hospitals having available beds and hospitals closest to a current location based on a diagnosis result of the severity of the myocardial infarction.

The control unit may generate emergency condition information notifying that the occupant is diagnosed with the myocardial infarction and the autonomous vehicle will self-drive to the hospital, transmit the emergency condition information to a traffic management server, receive traffic light control condition information corresponding to the emergency condition information from the traffic management server, and control the autonomous vehicle to self-drive to the hospital based on the traffic light control condition information.

According to the present disclosure, in the complex and noisy traffic situation, since the information indicating the emergency situation is provided to the pedestrian, it may be possible to allow the pedestrian to clearly determine and handle the emergency situation, thereby achieving more safe traffic system management.

According to the present disclosure, since the danger area is classified and set in advance and changed and recognized according to situations, it may be possible to enable the traffic light to identify the danger area more quickly and accurately.

In particular, since the danger area is differently changed and recognized depending on the color of light source and the type of object, it may be possible to identify the danger area more accurately.

Moreover, even though identification information is the same, the danger area may be differently recognized depending on the type of traffic light, and thus it may be possible to identify the danger area according to situations.

Additionally, accordingly, it may be possible to identify the object entering the danger area more quickly and output the alarm information at the optimal timing.

Since a myocardial infarction is an extreme emergency in which there is a golden hour, if a patient with myocardial infarction is transported to a hospital having no available beds, the patient wastes time and may miss the golden hour. According to the present disclosure, it may be possible to control the self-driving to the hospital having available beds to ensure that the patient has treatment within the golden hour.

The controlled self-driving to the user selected hospital may increase the autonomy of user selection, and when another occupant is especially the occupant's family member, he/she may be allowed to make the corresponding determination, thereby reducing the future dispute risks.

According to the present disclosure, since the appropriate hospital is determined by the autonomous vehicle 1" according to the severity of myocardial infarction, it may be possible to ensure that the patient may receive treatment in the best hospital for the patient's condition.

According to the present disclosure, since the occupant's video information and audio information are used together for myocardial infarction diagnosis, it may be possible to further increase the diagnosis accuracy.

According to the present disclosure, since the heartbeat sensor 40" does not operate in normal situation, and only when the extent to which the occupant leans to one side exceeds the predetermined threshold, the heartbeat sensor 40" operates, it may be possible to reduce power consumption, and since the amount of tilt and the heartbeat measurement result are used together for myocardial infarction diagnosis, it may be possible to further improve the precision in diagnosis.

According to the present disclosure, since the occupant is diagnosed with myocardial infarction only when both the motion sensor 60" measurement result and the pressure sensor 50" measurement result indicate that the occupant has a myocardial infarction, it may be possible to further improve the precision in diagnosis.

DETAILED DESCRIPTION

Figure 1:
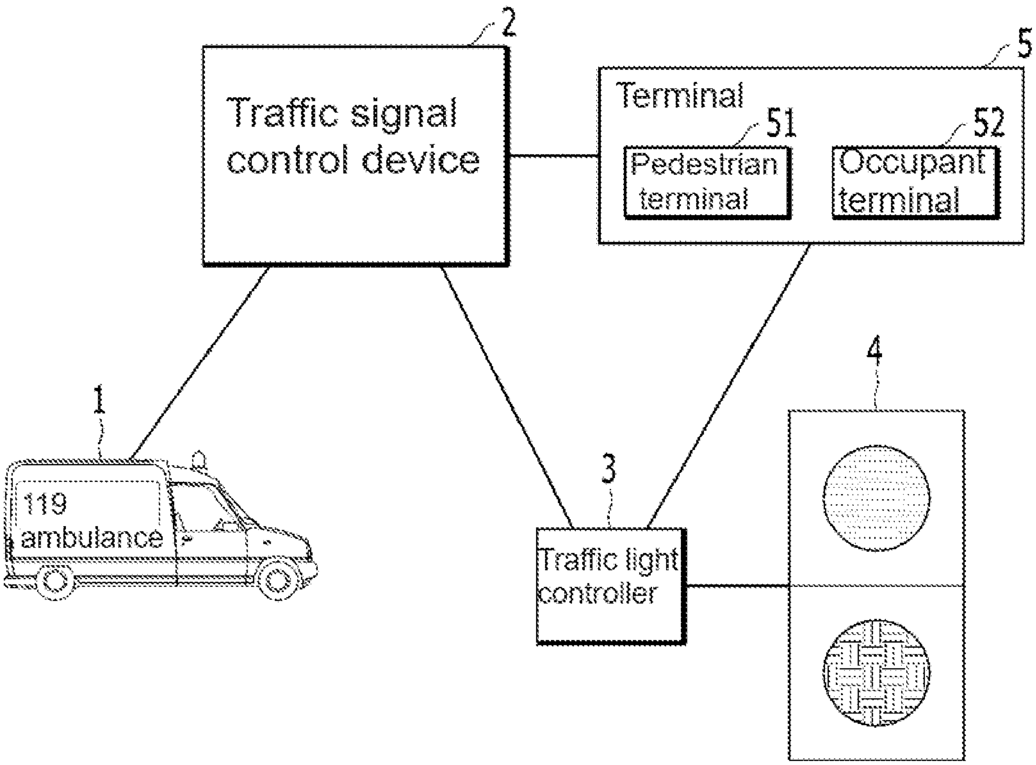
FIG. 1 is a system diagram of a traffic signal control system according to an embodiment.

The following detailed description of the present disclosure is made with reference to the accompanying drawings showing particular embodiments of the present disclosure by way of illustration. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure.

Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Figure 2:
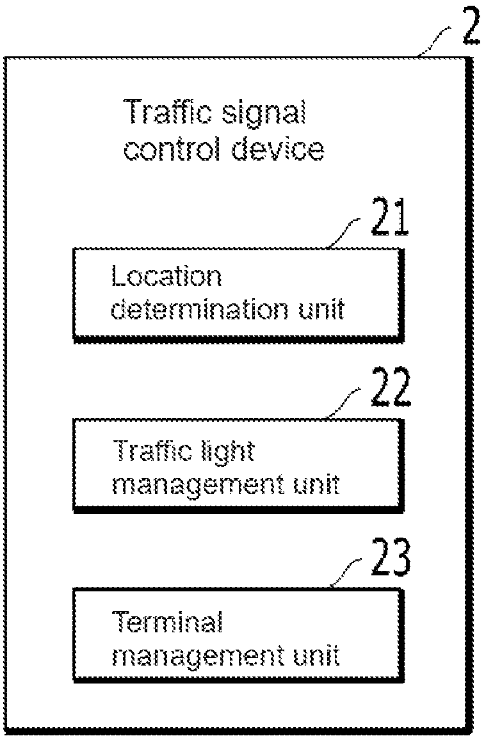
FIG. 2 is a block diagram of a traffic signal control device according to an embodiment.

FIG. 1 is a system diagram of a traffic signal control system according to an embodiment, and FIG. 2 is a block diagram of a traffic signal control device 2 according to an embodiment.

Referring to FIGS. 1 and 2 together, to begin with, the traffic signal control system is built by communication between an emergency vehicle 1, the traffic signal control device 2, a traffic light controller 3, a traffic light 4 and a terminal 5.

The emergency vehicle 1 may be an autonomous vehicle capable of transmitting and receiving data with the traffic signal control device 2.

The emergency vehicle 1 may transmit current location information to the traffic signal control device 2 using a location transmitter unit (not shown), or the traffic signal control device 2 may directly identify the location information of the emergency vehicle 1.

The traffic signal control device 2 may determine the location of the emergency vehicle 1 through a location determination unit 21, generate a traffic signal control command for controlling the output to the pedestrian traffic light 4 near the emergency vehicle 1, and transmit the traffic signal control command to the traffic light controller 3.

The traffic signal control device 2 may transmit, to the traffic light controller 3, the traffic signal control command that controls the output of information indicating an emergency situation related to the emergency vehicle 1 through a traffic light management unit 22.

The traffic signal control device 2 may transmit, to a pedestrian terminal 51, the traffic signal control command that controls the output of information indicating the emergency situation related to the emergency vehicle 1 through a terminal management unit 23.

The traffic light controller 3 may control the traffic light 4 based on the traffic signal control command received from the traffic signal control device 2.

The traffic light controller 3 may transmit the traffic signal control command received from the traffic signal control device 2 to the pedestrian terminal 51.

FIGS. 3A to 4F show examples of information outputted to the traffic light 4 in response to the traffic signal control command according to an embodiment.

Figure 3A:
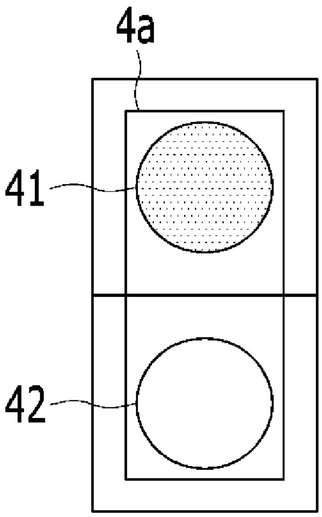
FIGS. 3A to 4F show examples of information outputted to a traffic light in response to a traffic signal control command according to an embodiment.
Figure 3B:
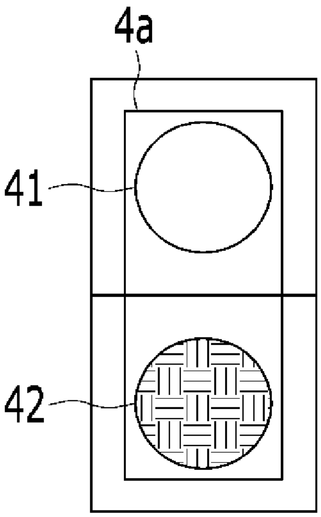

As shown in FIGS. 3A and 3B, the traffic light 4 may include a region 41 displaying Don't walk information and a region 42 displaying Walk information.

FIG. 3A shows that the region 41 displaying Don't walk information is activated to prohibit pedestrians from walking, and FIG. 3B shows that the region 42 displaying Walk information is activated to permit pedestrians to walk.

In FIG. 3A, the region 41 displaying Don't walk information is activated in a first color (for example, red), and the region 42 displaying Walk information is activated in a second color (for example, green).

Although FIGS. 3A and 3B show the region 41 displaying Don't walk information (hereinafter referred to as a first region) at the upper part of the traffic light 4 and the region 42 displaying Walk information (hereinafter referred to as a second region) at the lower part of the traffic light 4, also in the case of the contrary configuration, the present disclosure may be equally/similarly applied, and the present disclosure is not limited to the placement order and type of each region 41, 42.

That is, also in the case where each region 41, 42 is square, rectangular or hexagonal in shape, the shape of each region 41,42 is different from each other, or each region 41, 42 is different combinations of colors, the present disclosure may be equally/similarly applied.

Embodiment 1

Figure 4A:
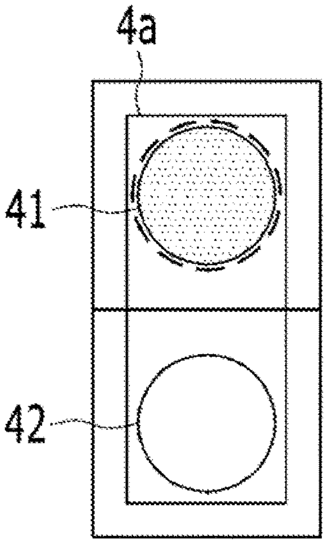

Referring to FIG. 4A, when the location determination unit 21 determines the location of the emergency vehicle 1, the traffic light management unit 22 may transmit, to the traffic light controller 3, the traffic signal control command that controls the output of information indicating the emergency situation to the pedestrian traffic light 4 near the emergency vehicle 1.

For reference, in the present disclosure, the information indicating the emergency situation is defined as image information outputted onto a display 4*a* of the traffic light 4.

Specifically, the traffic light management unit 22 may pre-store the information indicating the emergency situation in a storage unit (not shown), read the information indicating the emergency situation that matches the current emergency situation from the storage unit (not shown) and transmit the same to the traffic light controller 3.

According to an embodiment, the traffic signal control command may be generated as a signal for controlling the output of audio information together with the information indicating the emergency situation.

Meanwhile, according to an embodiment, referring to FIG. 4A, the traffic signal control command may control the activation (turning on) of the first region 41 to output Don't walk information, and control the output of the information indicating the emergency situation related to the emergency vehicle 1 to a region surrounding the first region 41. In this instance, the second region 42 may be inactivated (turned off).

The information indicating the emergency situation according to an embodiment may be outputted in at least one form of a) flash b) icon or c) text.

The icon according to an embodiment may be pre-stored in such a shape as to identify emergency information at a glance, for example, an emergency vehicle shape, an exclamation mark shape, a fire shape and so on.

The emergency vehicle shape may be differently outputted depending on the type of vehicle. For example, each of a fire truck shape, a police car shape and an ambulance shape may be differently pre-stored and outputted.

In the case of b), emergency vehicle-shaped icons may be outputted to the region surrounding the first region 41, arranged spaced a predetermined distance apart from each other, or in the case of c), each text of a sentence ("It is an emergency") may be outputted to the region surrounding the first region 41, arranged spaced a predetermined distance apart from each other.

In this instance, in each of a) to c), the information indicating the emergency situation may last for a predetermined time, or parts of the information may be outputted in a sequential order.

For example, the whole flash/the whole icon/the whole text may be continuously outputted for the predetermined time, or parts of the flash/parts of the icon/parts of the text may be outputted in a sequential order.

In this instance, when parts of the flash/parts of the icon/parts of the text are outputted in a sequential order, they may be outputted in the clockwise or counterclockwise direction with time.

According to an embodiment, at least part of each of a) to c) may be outputted in combination.

The information indicating the emergency situation according to an embodiment may be at least one of occurrence notification information of the emergency situation, the type of the emergency vehicle, the movement speed, the movement direction or the waiting time of the emergency vehicle.

For example, when the type of the emergency vehicle is an emergency vehicle, a fire truck, a police car, a construction vehicle and a tow truck, the icon shape of each vehicle may be different.

According to an embodiment, the traffic light management unit 22 may transmit, to the traffic light controller 3, the traffic signal control command that controls the generation and output of the information indicating the emergency situation reflecting information associated with the urgency level of the emergency vehicle 1.

In this instance, the traffic light management unit 22 may generate the traffic signal control command that controls the output of the audio information reflecting the information associated with the urgency level of the emergency vehicle 1 together.

The information associated with the urgency level of the emergency vehicle 1 may be classified into top/middle/low levels and used for reference.

The information associated with the urgency level of the emergency vehicle 1 may be received from any one of a connected server (not shown), the emergency vehicle 1 and an emergency vehicle occupant terminal 52 and used for reference.

According to an embodiment, the traffic light management unit 22 may generate the information indicating the emergency situation by adjusting at least one of brightness, size, duration, number or output speed of at least one of flash/emergency vehicle-shaped icon/text with reference to the information associated with the urgency level.

For example, when the emergency vehicle 1 is an emergency vehicle, the traffic light management unit 22 may identify that the urgency level of the emergency vehicle 1 is relatively the 'top' level from a hospital server (not shown), and accordingly, may generate the command that controls the output of flash type information with the 'top' brightness, the 'top' size and the 'top' duration.

Meanwhile, when the emergency vehicle 1 is a police car, the traffic light management unit 22 may identify that the urgency level of the emergency vehicle 1 is relatively the 'middle' level from a crime management server (not shown), and accordingly, may generate the command that controls the output of the police car-shaped icon with the 'middle' size, the 'middle' number and the 'middle' output speed.

According to an embodiment, the traffic light management unit 22 may generate the traffic signal control command for outputting display information indicating the emergency situation together by adjusting at least one of the size or duration of the audio information with reference to the information associated with the urgency level.

For example, when the urgency level is the 'top' level, the traffic light management unit 22 may control the output at the volume of about 100 decibels for about 5 seconds, and when the urgency level is the 'middle' level, the traffic light management unit 22 may control the output at the volume of about 50 decibels for about 2 seconds.

Meanwhile, according to an embodiment, the terminal management unit 23 may receive the traffic signal control command from the traffic light management unit 22 and control the output to the pedestrian terminal 51.

That is, the traffic signal control command that controls the output of the display information and/or the audio information indicating the emergency situation together with the Don't walk information may be transmitted through an app of the pedestrian terminal 51 located near the pedestrian traffic light 4.

Accordingly, in the complex and noisy traffic situation, the pedestrian may clearly determine and handle the emergency situation by receiving the above-described information from the pedestrian terminal 51, and accordingly it may be possible to achieve more safe traffic system management.

Additionally, according to embodiment 1, it may be possible to identify Don't walk information as well as clearly identifying the emergency situation without interference.

Embodiment 2

Embodiment 2 relates to FIG. 4B, and for the description that is not made below, the above description of embodiment 1 may be equally/similarly applied.

Figure 4B:
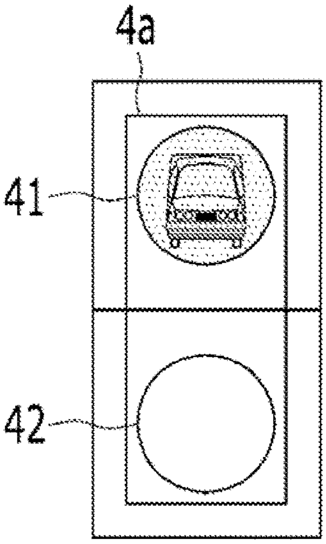

According to an embodiment, referring to FIG. 4B, the traffic signal control command may control the activation of the first region 41 to output Don't walk information and control the output of the information indicating the emergency situation related to the emergency vehicle 1 together on the first region 41 in an overlapping manner. In this instance, the second region 42 may be inactivated (turned off).

The information indicating the emergency situation according to an embodiment may be outputted in at least one form of a) flash b) icon or c) text.

In the case of b), an emergency vehicle-shaped icon or an exclamation mark-shaped icon may be outputted to the central part of the first region 41 in an overlapping manner, or in the case of c), a certain text ("emergency") among each text of the sentence ("It is an emergency") may be outputted to the central part of the first region 41 in an overlapping manner.

In this instance, in each of a) to c), the information indicating the emergency situation may last for the predetermined time, or parts of the information may be outputted in a sequential order.

According to an embodiment, at least part of each of a) to c) may be outputted in combination.

According to an embodiment, the traffic light management unit 22 may generate the information indicating the emergency situation by adjusting at least one of brightness, size, duration, number or output speed of at least one of flash/emergency vehicle-shaped icon/text with reference to the information associated with the urgency level.

For example, when the emergency vehicle 1 is an emergency vehicle, the traffic light management unit 22 may identify that the urgency level of the emergency vehicle 1 is relatively the 'top' level from the hospital server (not shown), and accordingly, may generate the command that controls the output of the icon to the central part of the first region 41 in an overlapping manner with the 'top' brightness, the 'top' size and the 'top' duration.

Meanwhile, when the emergency vehicle 1 is a police car, the traffic light management unit 22 may identify that the urgency level of the emergency vehicle 1 is relatively the 'middle' level from the crime management server (not shown), and accordingly, may generate the command that controls the output of the police car-shaped icon to the central part of the first region 41 in an overlapping manner with the ‘middle’ size and the ‘middle’ duration.

Embodiment 3

Embodiment 3 relates to FIG. 4C, and for the description that is not made below, the above description of embodiment 1 may be equally/similarly applied.

Figure 4C:
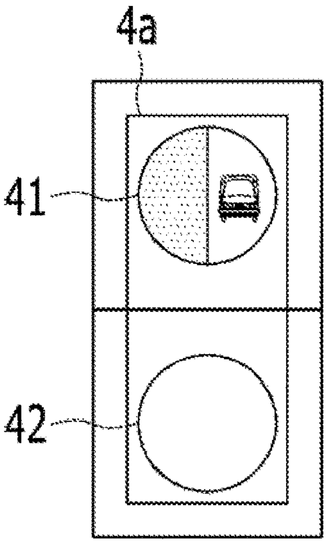

According to an embodiment, referring to FIG. 4C, the traffic signal control command may control the activation of the first region 41 to output Don’t walk information to a first part region of the first region 41 and the information indicating the emergency situation related to the emergency vehicle 1 to a second part region of the first region 41 together. The first part region and the second part region may be different from each other and divided in the equal ratio within the first region 41.

In this instance, the second region 42 may be inactivated (turned off).

The information indicating the emergency situation according to an embodiment may be outputted in at least one form of a) flash, b) icon or c) text.

In this instance, in each of a) to c), the information indicating the emergency situation may last for the predetermined time, or parts of the information may be outputted in a sequential order.

According to an embodiment, at least part of each of a) to c) may be outputted in combination.

According to an embodiment, the traffic light management unit 22 may generate the information indicating the emergency situation by adjusting at least one of brightness, size, duration, number or output speed of at least one of flash/emergency vehicle-shaped icon/text with reference to the information associated with the urgency level.

For example, when the emergency vehicle 1 is an emergency vehicle, the traffic light management unit 22 may identify that the urgency level of the emergency vehicle 1 is relatively the ‘top’ level from the hospital server (not shown), and accordingly may generate the command that controls the output of the icon to the second part region of the first region 41 with the ‘top’ brightness, the ‘top’ size and the ‘top’ duration.

Meanwhile, when the emergency vehicle 1 is a police car, the traffic light management unit 22 may identify that the urgency level of the emergency vehicle 1 is relatively the ‘middle’ level from the crime management server (not shown), and accordingly, may generate the command that controls the output of the police car-shaped icon to the second part region of the first region 41 with the ‘middle’ size and the ‘middle’ duration.

Embodiment 4

Embodiment 4 relates to FIG. 4D, and for the description that is not made below, the above description of embodiment 1 may be equally/similarly applied.

Figure 4D:
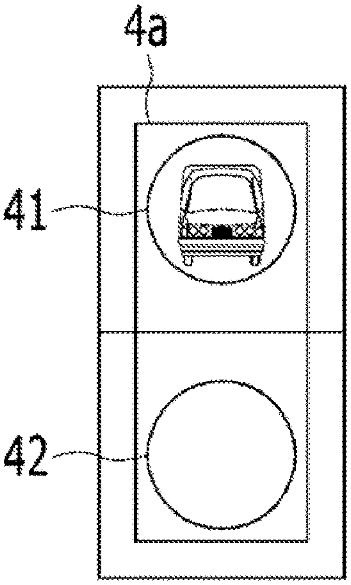

According to an embodiment, referring to FIG. 4D, the traffic signal control command may control the output of only the information indicating the emergency situation related to the emergency vehicle 1 to the first region 41. In this instance, Don’t walk information may not be outputted to the first region 41, and the second region 42 may be inactivated (turned off).

The information indicating the emergency situation according to an embodiment may be outputted in at least one form of a) flash, b) icon or c) text.

In this instance, in each of a) to c), the information indicating the emergency situation may last for the predetermined time, or parts of the information may be outputted in a sequential order.

According to an embodiment, at least part of each of a) to c) may be outputted in combination.

According to an embodiment, the traffic light management unit 22 may generate the information indicating the emergency situation by adjusting at least one of brightness, size, duration, number or output speed of at least one of flash/emergency vehicle-shaped icon/text with reference to the information associated with the urgency level.

For example, when the emergency vehicle 1 is an emergency vehicle, the traffic light management unit 22 may identify that the urgency level of the emergency vehicle 1 is relatively the ‘top’ level from the hospital server (not shown), and accordingly, may generate the command that controls the output of the icon to the central part of the first region 41 with the ‘top’ brightness, the ‘top’ size and the ‘top’ duration.

Meanwhile, when the emergency vehicle 1 is a police car, the traffic light management unit 22 may identify that the urgency level of the emergency vehicle 1 is relatively the ‘middle’ level from the crime management server (not shown), and accordingly, may generate the command that controls the output of the police car-shaped icon to the central part of the first region 41 with the ‘middle’ size and the ‘middle’ duration.

Embodiment 5

Embodiment 5 relates to FIG. 4E, and for the description that is not made below, the above description of embodiment 1 may be equally/similarly applied.

Figure 4E:
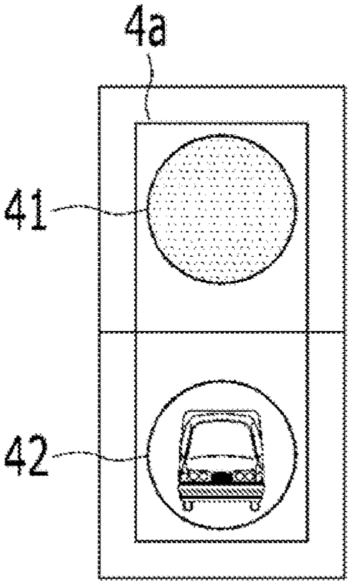

According to an embodiment, referring to FIG. 4E, the traffic signal control command may control the activation of the first region 41 to output Don’t walk information and control the output of the information indicating the emergency situation related to the emergency vehicle 1 to the second region 42.

The information indicating the emergency situation according to an embodiment may be outputted in at least one form of a) flash, b) icon or c) text.

In the case of b), an emergency vehicle-shaped icon or an exclamation mark-shaped icon may be outputted to the central part of the second region 42, or in the case of c), a certain text (“emergency”) among each text in the sentence (“It is an emergency”) may be outputted to the central part of the second region 42.

In this instance, in each of a) to c), the information indicating the emergency situation may last for the predetermined time, or parts of the information may be outputted in a sequential order.

According to an embodiment, at least part of each of a) to c) may be outputted in combination.

According to an embodiment, the traffic light management unit 22 may generate the information indicating the emergency situation by adjusting at least one of brightness, size, duration, number or output speed of at least one of flash/emergency vehicle-shaped icon/text with reference to the information associated with the urgency level.

For example, when the emergency vehicle 1 is an emergency vehicle, the traffic light management unit 22 may identify that the urgency level of the emergency vehicle 1 is relatively the 'top' level from the hospital server (not shown), and accordingly, may generate the command that controls the output of the icon to the central part of the second region 42 with the 'top' brightness, 'top' size and the 'top' duration.

Meanwhile, when the emergency vehicle 1 is a police car, the traffic light management unit 22 may identify that the urgency level of the emergency vehicle 1 is relatively the 'middle' level from the crime management server (not shown), and accordingly, may generate the command that controls the output of the police car-shaped icon to the central part of the second region 42 with the 'middle' size and the 'middle' duration.

Embodiment 6

Embodiment 6 relates to FIG. 4F, and for the description that is not made below, the above description of embodiment 1 may be equally/similarly applied.

Figure 4F:
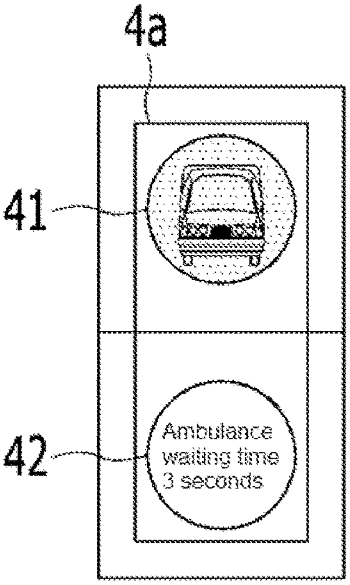

According to an embodiment, referring to FIG. 4F, the traffic signal control command may control the activation of the first region 41 to output Don't walk information and control the output of the information indicating the emergency situation related to the emergency vehicle 1 to both the first region 41 and the second region 42.

According to an embodiment, the information indicating the same type of emergency situation may be outputted to each of the first region 41 and the second region 42, and according to another embodiment, the information indicating different types of emergency situations may be outputted.

The information indicating the emergency situation according to an embodiment may be outputted in at least one form of a) flash, b) icon or c) text.

For example, like b), an emergency vehicle-shaped icon or an exclamation mark-shaped icon may be outputted to the central part of the first region 41 in an overlapping manner, and the sentence ("ambulance waiting time 3 seconds.") like c) may be outputted to the central part of the second region 42.

In this instance, in each of a) to c), the information indicating the emergency situation may last for the predetermined time, or parts of the information may be outputted in a sequential order.

According to an embodiment, at least part of each of a) to c) may be outputted in combination.

According to an embodiment, the traffic light management unit 22 may generate the information indicating the emergency situation by adjusting at least one of brightness, size, duration, number of output speed of at least one of flash/emergency vehicle-shaped icon/text with reference to the information associated with the urgency level.

Additionally, according to an embodiment, the level of adjustment of the above-described elements of the information indicating the emergency situation included in the first region 41 may be different from the level of adjustment of the above-described elements of the information indicating the emergency situation included in the second region 42.

For example, when the emergency vehicle 1 is an emergency vehicle, the traffic light management unit 22 may identify that the urgency level of the emergency vehicle 1 is relatively the 'top' level from the hospital server (not shown), and accordingly, may generate the command that controls the output of the icon to the central part of the first region 41 with the 'top' brightness, the 'top' size and the 'top' duration and the output of the text to the central part of the second region 42 with the 'top' brightness, the 'top' size and the 'middle' duration.

Meanwhile, when the emergency vehicle 1 is a police car, the traffic light management unit 22 may identify that the urgency level of the emergency vehicle 1 is relatively the 'middle' level from the crime management server (not shown), and accordingly, may generate the command that controls the output of the police car-shaped icon to the central part of the first region 41 with the 'middle' size and the 'middle' duration and the output of the text to the central part of the second region 42 with the 'middle' brightness, the 'middle' size and the 'low' duration.

According to embodiment 6, since the information indicating the emergency situation is outputted to both the first region 41 and the second region 42, it may be possible to transmit the information associated with the emergency situation more accurately, and it may be possible to output long sentence information made up of texts with improved visibility.

Figure 5:
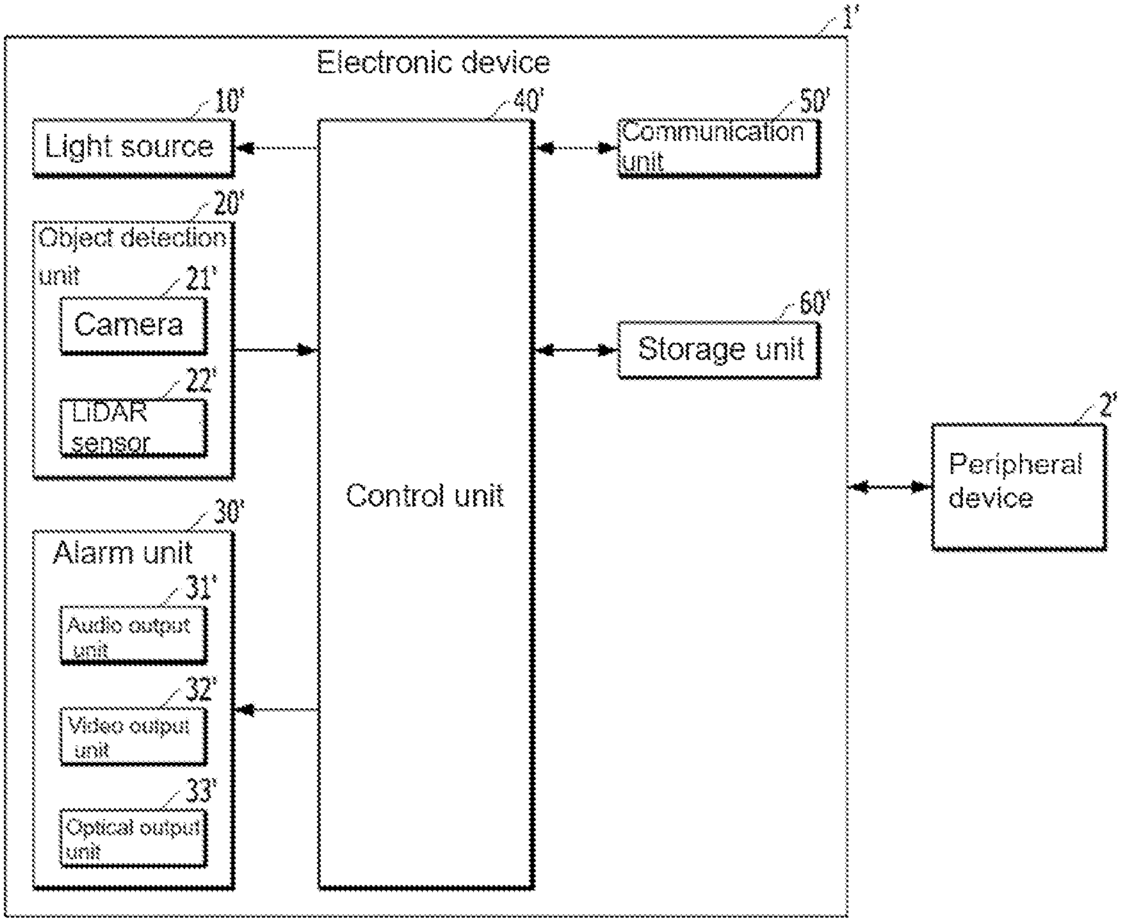
FIG. 5 is a block diagram showing an electronic device 1' and a peripheral device 2' according to an embodiment.

FIG. 5 is a block diagram showing an electronic device 1' and a peripheral device 2' according to an embodiment.

As shown in FIG. 5, the electronic device 1' according to an embodiment may include a light source 10', an object detection unit 20', an alarm unit 30', a control unit 40', a communication unit 50', and a storage unit 60'.

According to an embodiment, the electronic device 1' may refer to any type of device that outputs light and detects an object, and typically, may include, for example, a traffic light, but the scope of protection of the present disclosure is not limited thereto.

The electronic device 1' may include a traffic light for pedestrians and a traffic light for vehicles.

The light source 10' is configured to provide the light for output from the electronic device 1' and may include a light emitting diode (LED).

The light source 10' may output the light selected from red light, yellow light and green light.

The light source 10' may be turned on/off under the control of the control unit 40'.

The object detection unit 20' may sense environment information around the electronic device 1' to detect the object located in the vicinity of the electronic device 1', generate object information based on the sensing data and transmit the generated object information to the control unit 40'. In this instance, the object may include a variety of objects that exist near the electronic device 1', for example, humans, vehicles, animals and so on.

The object detection unit 20' may include a camera 21', a LIDAR sensor 22', an ultrasonic sensor, a radar sensor, an infrared sensor and so on.

The alarm unit 30' is configured to output alarm information, and may include an audio output unit 31', a video output unit 32' and an optical output unit 33'.

The control unit 40' controls the whole operation of each component of the electronic device 1'.

The communication unit 50' is responsible for data transmission/reception with the peripheral device 2'.

The communication unit 50' may carry out communication with the peripheral device 2' in a predetermined long/short range.

The storage unit 60' may store any type of information necessary for the operation of the electronic device 1', and the control unit 40' may read the information stored in the storage unit 60' and control the electronic device 1'.

The peripheral device 2' may include a device such as a mobile terminal possessed by a human who communicates with the electronic device 1', an autonomous vehicle or a non-autonomous vehicle, or a device possessed by an occupant of the vehicle.

The peripheral device 2' may receive and output the alarm information transmitted from the electronic device 1'.

Figure 6:
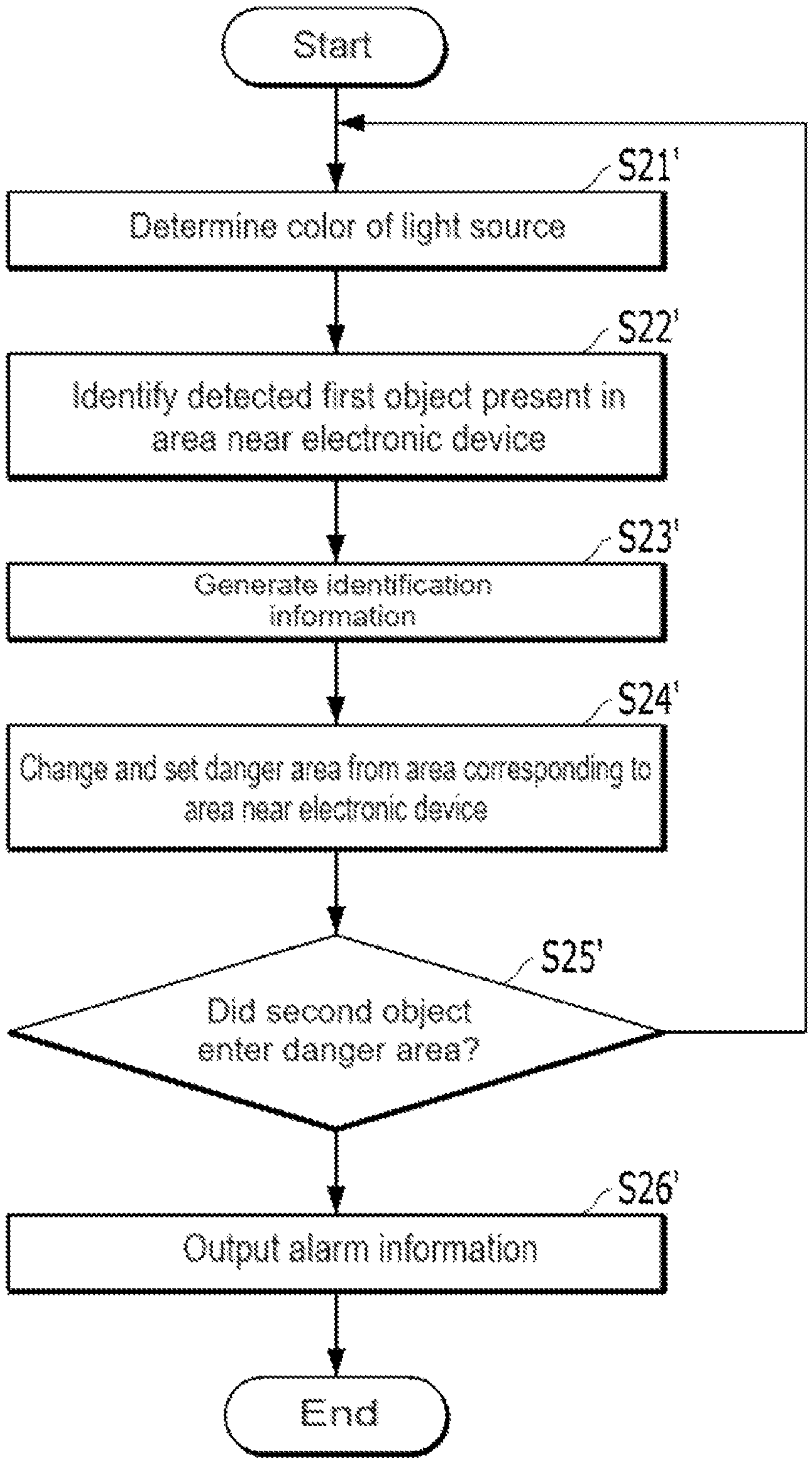
FIG. 6 is a diagram illustrating the operation of an electronic device 1' according to an embodiment.

FIG. 6 is a diagram illustrating the operation of the electronic device 1' according to an embodiment, and FIGS. 7A to 8B are reference drawings used to describe the operation of the electronic device 1'.

The control unit 40' may determine the color of the flashing light source 10' (S21').

The control unit 40' may determine the color of the flashing light source 10' among red, green and yellow.

Additionally, the control unit 40' may identify a first object detected by the object detection unit 20', present in the vicinity of the electronic device 1' (S22').

For example, at least one of the type, location or size of the first object detected may be identified.

The control unit 40' may identify whether the first object detected by the object detection unit 20' is a human or a vehicle.

According to an embodiment, the control unit 40' may identify the detected first object using image data acquired from the camera 21' and point map data acquired from the LiDAR sensor 22' together.

Specifically, the control unit 40' may identify the detected first object using the point map data acquired from the LiDAR sensor 22', and then identify the same object using the image data acquired from the camera 21'.

According to an embodiment, the detected first object may be a preset object.

According to the present disclosure, since the LiDAR sensor 22' and the camera 21' are used together to identify the object, it may be possible to further improve the precision in object recognition.

The control unit 40' may generate identification information by combining the determined color of the light source 10' with information identifying the first object detected through the object detection unit 20' (S23').

Additionally, the danger area may be changed and set from an area of the image data acquired from the camera 21' corresponding to the area actually located near the electronic device based on the identification information (S24').

The control unit 40' may set the danger area from the area of the image data corresponding to the area actually located near the electronic device 1' using the image data acquired from the camera 21' and the point map data acquired from the LiDAR sensor 22' together.

Specifically, the control unit 40' may acquire the point cloud map data which is a set of points representing a 3D shape from the LiDAR sensor 22'.

The control unit 40' may identify the danger area from the area on the point cloud map data corresponding the area actually located near the electronic device 1', identify the area on the image data corresponding to the area on the point cloud map data corresponding to the area actually located near the electronic device 1', and then identify the danger area on the image data corresponding to the danger area on the point cloud map data.

According to an embodiment, the area on the point cloud map data corresponding to the area actually located near the electronic device 1' and the danger area, and the area on the image data and the danger area corresponding to them may be preset and pre-stored in the storage unit 60'.

According to the present disclosure, since the LiDAR sensor 22' and the camera 21' are used together to recognize the area, it may be possible to further improve the precision in area recognition.

In this instance, the control unit 40' may change and recognize the danger area using the image data acquired from the camera 21' and the point map data acquired from the LiDAR sensor 22' together.

Specifically, the control unit 40' may set the danger area using the image data acquired from the camera 21' and the point map data acquired from the LiDAR sensor 22' together as described above, and change and recognize the danger area from the area of the image data acquired from the camera 21' corresponding to the area actually located near the electronic device based on the color of the flashing light source 10' and the type of the object detected through the object detection unit 20'.

According to an embodiment, the danger area is a safety area for the first object and may be defined an area for prohibiting a second object from entering the corresponding danger area, wherein the second object is different from the first object.

According to an embodiment, each of the area of the image data acquired from the camera 21' corresponding to the area actually located near the electronic device and the danger area may be preset and pre-stored in the storage unit 60'.

According to an embodiment, the danger area may be mapped to the identification information and classified and set in the storage unit 60' in advance, and the danger area may be changed and recognized in response to the read identification information.

Figure 7A:
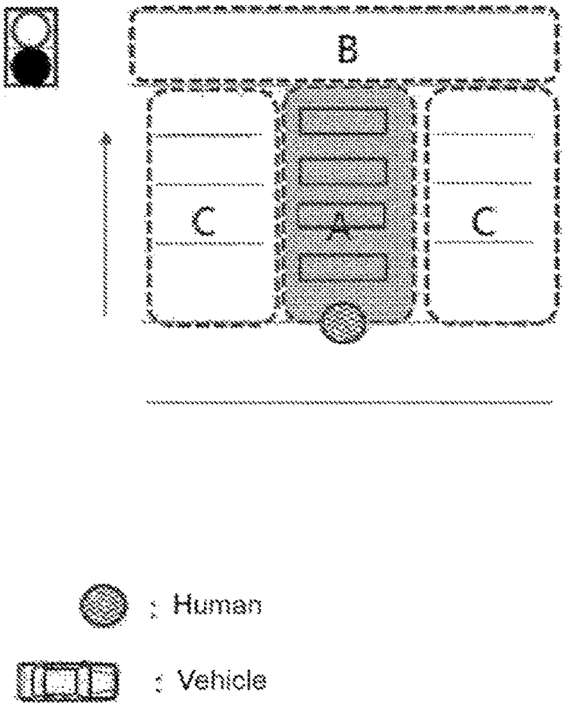
FIGS. 7A to 8B are reference drawings used to describe the operation of an electronic device 1'.
Figure 7B:
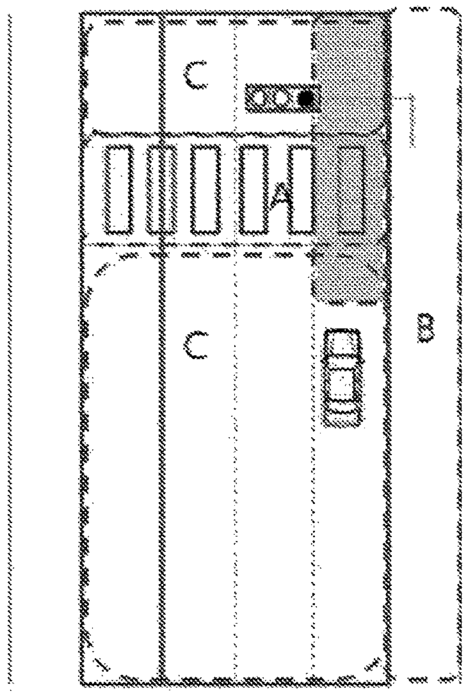

According to an embodiment, the area on the image data corresponding to the area actually located near the electronic device 1' may include a crosswalk area (A), a sidewalk area (B) and a driveway area (C) as shown in FIGS. 7A and 7B.

Additionally, the danger area is a region of interest of the electronic device 1', and may correspond to a portion of at least one selected from the crosswalk area (A), the sidewalk area (B) and the driveway area (C), or a portion of each area.

FIG. 7A shows that the electronic device 1' is a pedestrian electronic device, and when the color of the flashing light source 10' is green (black shaded area) and the detected object is a human (a zigzag pattern), the crosswalk area (A) is recognized as the danger area (gray shaded area). That is, in the case of FIG. 7A, the pedestrian electronic device is green and the human is expected to be located on the crosswalk area (A), and thus the crosswalk area (A) may be set as the danger area to prohibit any other second object (for example, a vehicle) excluding the human from entering the crosswalk area (A).

However, in this instance, the range of the second object for prohibiting it from entering the danger area may be set and stored in advance corresponding to the first object.

That is, even though the second object is a different type from the first object, dogs, bikes and the like are not a prohibited object, and motorbikes, vehicles and the like may be set as a prohibited object.

According to an embodiment, when the color of the flashing light source 10' of the pedestrian electronic device is green and the object that exists in the vicinity of the electronic device 1' recognized from the image is a human, the control unit 40' may change and recognize the danger area based on the remaining time available for the human to cross.

Specifically, when the human enters the crosswalk area (A), the control unit 40' may calculate the remaining time available for the human to cross, and differently calculate the remaining time for crossing depending on the location at which the human is positioned in the crosswalk area (A), thereby changing and recognizing the danger area. For example, the danger area when the remaining time for crossing is relatively long and the danger area when the remaining time for crossing is relatively short may be differently recognized.

Figure 8A:
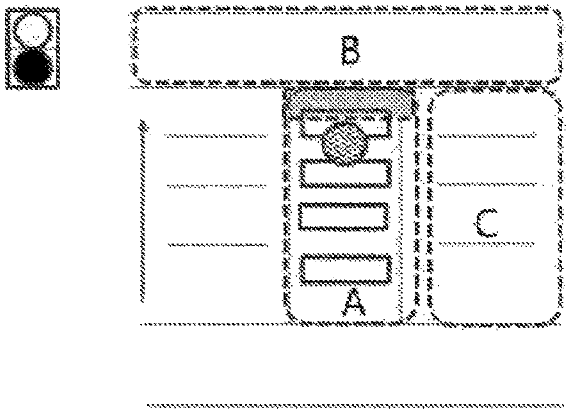

Referring to FIGS. 7A and 8A, when the human crosses in the direction of the arrow, in FIG. 7A, the remaining time for crossing may be calculated as 10 seconds, starting from the time when the human just entered the crosswalk area (A), and accordingly the entire crosswalk area (A) may be recognized as the danger area (gray shaded area). In contrast, in FIG. 8A, when the human almost completed crossing the crosswalk area (A), the remaining time for crossing may be calculated as 1 second, and accordingly a portion of the crosswalk area (A) may be recognized as the danger area (gray shaded area).

In this case, the size of the portion of the crosswalk area (A) which is the danger area may be recognized in proportion to the remaining time for crossing.

That is, when the remaining time for crossing is long, this signifies that the danger area is large, and an alarm may be outputted when the corresponding object enters the corresponding danger area.

Meanwhile, FIG. 7B shows that the electronic device 1' is an electronic device for vehicles, and when the color of the flashing light source 10' is green (black shaded area) and the detected object is a vehicle, a portion of the area including the driveway area (C) and the crosswalk area (A) is recognized as the danger area (gray shaded area). That is, in the case of FIG. 7B, the electronic device for vehicles is green and the vehicle is expected to be located at the portion of the area including the driveway area (C) and the crosswalk area (A), and thus the corresponding area may be set as the danger area to prohibit any other second object (for example, a human, a motorbike, etc.) excluding the corresponding vehicle from entering the corresponding area.

However, in this instance, the range of the second object for prohibiting it from entering the danger area may be set and stored in advance corresponding to the first object.

According to an embodiment, the control unit 40' may change and recognize the danger area based on the driving speed of the vehicle.

Specifically, the control unit 40' may determine the driving speed of the vehicle and calculate the size of the danger area in proportion to the determined driving speed. That is, when the driving speed of the vehicle is relatively fast, the size of the danger area may be calculated to be relatively large, and when the driving speed of the vehicle is relatively slow, the size of the danger area may be calculated to be relatively small.

Meanwhile, when the color of the flashing light source 10' of the electronic device for vehicles is green and the object that exists in the vicinity of the electronic device 1' recognized from the image is a vehicle, the control unit 40' may change and recognize the danger area based on the lane on which the vehicle drives.

Figure 8B:
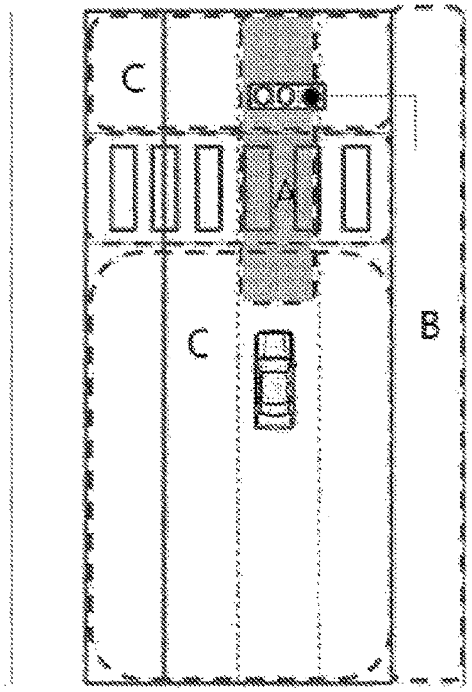

Referring to FIGS. 7B and 8B, when the vehicle is located on the rightmost lane as shown in FIG. 7B, a portion of the area including the driveway area (C) and the crosswalk area (A) corresponding to the rightmost lane may be set as the danger area, while when the vehicle is located on the middle lane as shown in FIG. 8B, a portion of the area including the driveway area (C) and the crosswalk area (A) corresponding to the middle lane may be set as the danger area.

Under the recognition of the danger area on the basis of the first object, when the control unit 40' determines that the second object entered the danger area (S25'), the control unit 40' may control the alarm unit 30' to output the alarm information (S26').

The object detection unit 20' may detect the second object equally/similarly to the first object, and the control unit 40' may identify the second object detected through the object detection unit 20'.

According to an embodiment, the second object may be defined as an object that is a different type from the first object and prohibited from entering the danger area.

According to an embodiment, the second object may be defined corresponding to the first object by relatively mapping them.

The control unit 40' may output the alarm information in at least one form of audio, video or light.

According to the present disclosure, since the danger area is classified and set in advance, and changed and recognized according to situations, it may be possible to allow the electronic device 1' to identify the danger area more quickly and accurately.

In particular, since the danger area is differently changed and recognized depending on the color of the light source 1 and the type of the object, it may be possible to identify the danger area more accurately.

For example, it is possible to accurately identify whether the object entered the danger area by clearly identifying whether the object is located at the danger area, between the danger area and the safety area or at the safety area.

Furthermore, even though identification information is the same, since the danger area is differently recognized depending on the type of the electronic device, it may be possible to identify the danger area according to situations.

Additionally, accordingly, it may be possible to identify the object entering the danger area more quickly and output alarm information at the optimal timing.

Meanwhile, according to an embodiment, the control unit 40' may change and recognize at least one of the size, number or location of the danger area based on the identification information.

For example, as shown in FIGS. 7A and 7B, the location of the danger area may be changed and recognized, and as shown in FIGS. 7A and 8A, the size of the danger area may be changed and recognized.

According to an embodiment, the control unit 40' may control the alarm unit 30' to output different types of alarm information according to at least one of the type of the object or the hour range.

Specifically, the alarm unit 30' may output the alarm information in the form of light, video and audio, and select and output at least some of the different types of alarm information according to at least one of the type of the object or the hour range.

For example, as shown in FIG. 7B, when the color of the flashing light source 10' is green and a human is detected in the danger area at nighttime, a message commanding the human to escape the danger area may be outputted through the audio output unit 31' and a warning type light may be outputted through the optical output unit 33'.

In contrast, as shown in FIG. 7A, when the color of the flashing light source 10' is green and a vehicle is detected in the danger area at daytime, a message commanding the vehicle to escape the danger area may be outputted through the audio output unit 31' and the situation of the vehicle entering the crosswalk may be outputted in the form of image through the video output unit 32'.

That is, in view of the hour range, nighttime, the alarm information may be outputted in the form of light to the human who does not possess a lighting, and in the case of the hour range, daytime, light type alarm information is not outputted and the image type alarm information may be outputted to the vehicle having a lighting.

According to an embodiment, the control unit 40' may provide the alarm information to the peripheral device 2', and control the peripheral device 2' to output the alarm information.

The control unit 40' may carry out communication with the peripheral device 2' in the predetermined short range through the communication unit 50'.

The control unit 40' may identify whether the peripheral device 2' is a device such as a mobile terminal possessed by a human or a vehicle, and control the peripheral device 2' to output different types of alarm information depending on the identification result.

Figure 9:
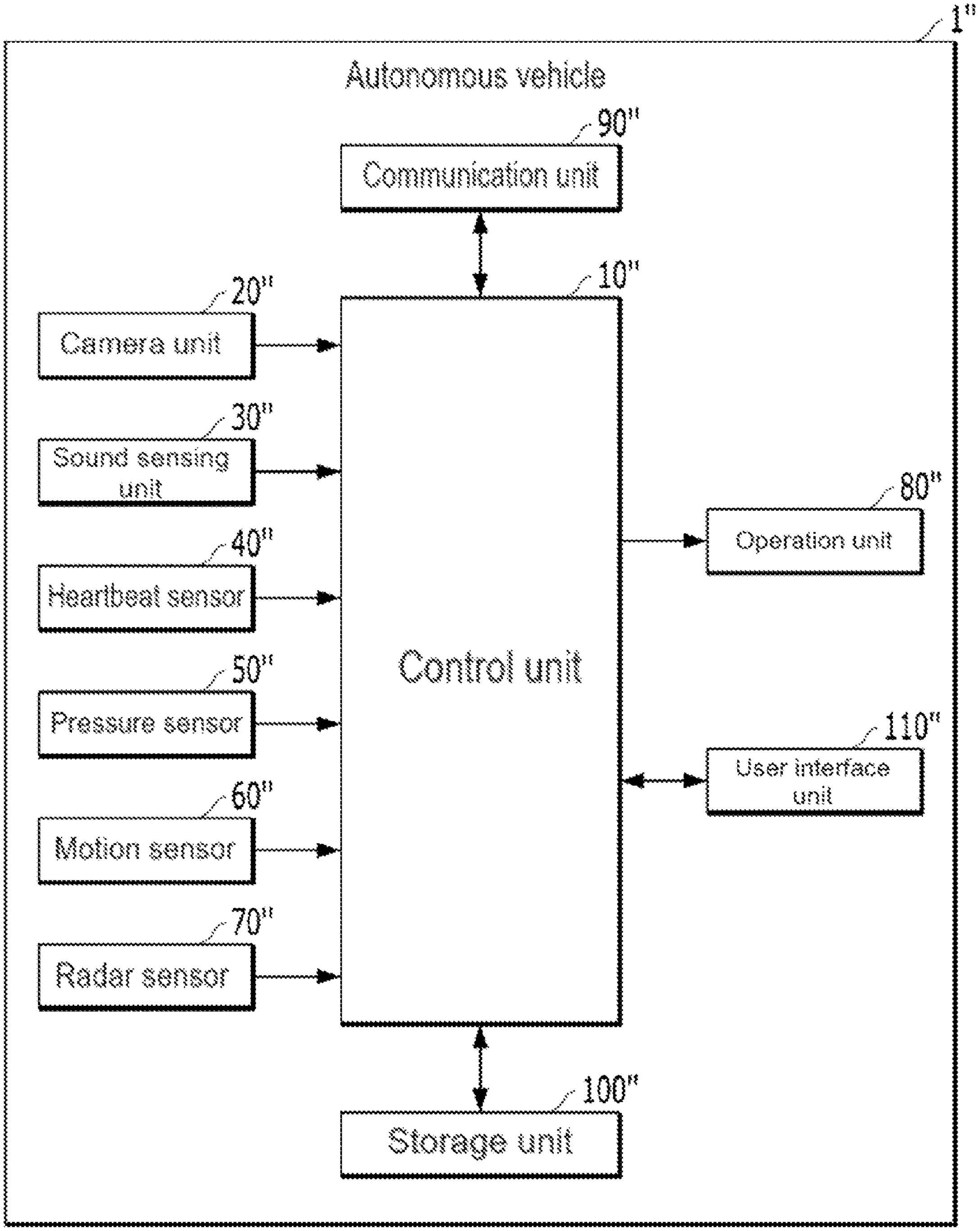
FIG. 9 is a block diagram of an autonomous vehicle 1" according to an embodiment.

FIG. 9 is a block diagram of an autonomous vehicle 1" according to an embodiment.

As shown in FIG. 9, the autonomous vehicle 1" may include a control unit 10", a camera unit 20", a sound sensing unit 30", a heartbeat sensor 40", a pressure sensor 50", a motion sensor 60", a radar sensor 70", an operation unit 80", a communication unit 90", a storage unit 100", and a user interface unit 110".

Hereinafter, a process of generating a command for self-driving by performing the operation between the control unit 10" and each component will be described below through each embodiment.

Embodiment 1

According to an embodiment, when the camera unit 20" generates an image of an occupant, the control unit 10" may diagnose the occupant with myocardial infarction using information acquired from the corresponding image.

The camera unit 20" may include at least one image sensor, and capture the interior environment of the autonomous vehicle 1" in real time to acquire a 2D/3D image.

The camera unit 20" may be mounted at a predetermined location (for example, a rearview mirror) of the autonomous vehicle 1" to generate the image representing the behavior and condition of the occupant in the autonomous vehicle 1".

For example, in the present disclosure, the occupant is defined as a driver or a passenger.

The number of camera units 20" may be one or more.

According to an embodiment, when it is determined that the occupant's image acquired by the camera unit 20" represents 1) the occupant grabbing the chest with his/her hand, and at the same time, 2) the degree of facial contortion of the occupant is larger than the predetermined threshold, and 3) the occupant's upper body leans at the predetermined angle or more, the control unit 10" may diagnose the occupant with myocardial infarction.

Specifically, reference comparative information for each of 1), 2) and 3) may be pre-stored in the storage unit 100", and the control unit 10" may diagnose the myocardial infarction by comparing frames acquired in real time for each of 1), 2) and 3) with the reference comparative information pre-stored in the storage unit 100".

According to an embodiment, the pre-stored reference comparative information of the present disclosure may be acquired by machine learning repeatedly performed by an artificial intelligence algorithm to determine the myocardial infarction.

According to an embodiment, the myocardial infarction may be diagnosed by detecting at least one information as to whether the occupant's gaze is directed down less than the predetermined angle, whether the occupant's eyes are closed as if the occupant might faint, or whether the occupant's body leans to one side together from the image.

According to an embodiment, when these shapes are repeatedly acquired from multiple frames for a predetermined time or more, the myocardial infarction may be diagnosed.

Besides, any image shape that may be defined as myocardial infarction by training from the same behavior pattern of myocardial infarction patients may be equally/similarly applied to the present disclosure.

Figure 10:
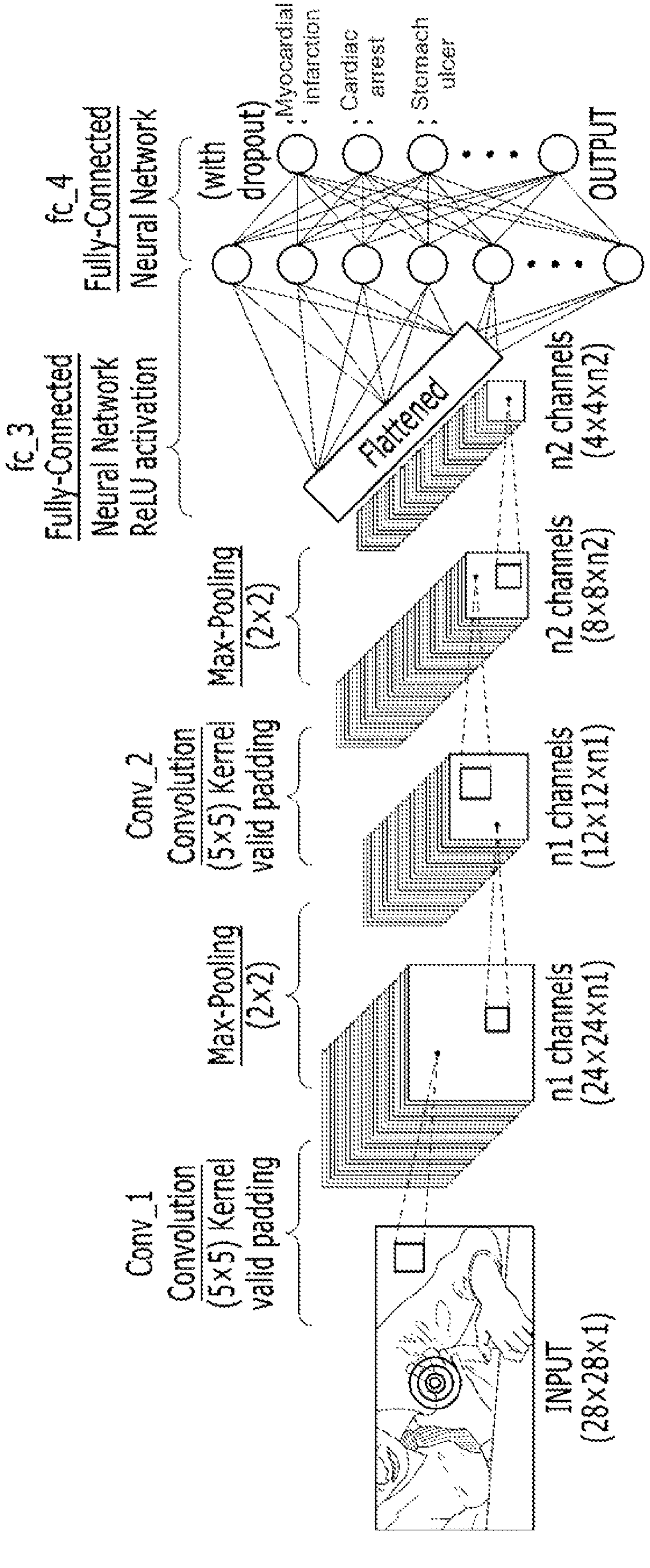
FIG. 10 is a diagram illustrating a myocardial infarction output process through an artificial intelligence-based myocardial infarction analysis model according to an embodiment.

Referring to FIG. 10 together, the control unit 10" may generate a myocardial infarction analysis model by training neural networks, and perform an inference process of outputting myocardial infarction diagnosis information from the occupant image using the generated myocardial infarction analysis model.

To this end, first of all, the control unit 10" may generate a dataset for the occupant image in advance.

The control unit 10" may preprocess the generated dataset to apply the dataset to a deep learning algorithm.

For example, preprocessing such as crop, shift, flipping and color changes may be performed.

The control unit 10" may build the myocardial infarction analysis model by repeating machine learning that inputs the preprocessed dataset to the prepared neural networks and outputs the myocardial infarction diagnosis information from the neural networks.

According to an embodiment, the myocardial infarction analysis model may be built through machine learning in convolutional neural networks using the preprocessed dataset as input and fully connected neural networks using the output of the convolutional neural networks as input.

According to an embodiment, the preprocessed dataset may be inputted to the convolutional neural networks, and the convolutional neural networks may analyze the features of the occupant image and output feature pattern information.

According to an embodiment, the convolutional neural networks may output the feature pattern information associated with the occupant shape as to whether the occupant image represents the occupant grabbing the chest with his/her hand, whether the degree of facial contortion of the occupant is larger than the predetermined threshold, and whether the occupant's upper body leans at the predetermined angle or more.

Additionally, the myocardial infarction analysis model for diagnosing a myocardial infarction that is the classified disease may be built by training the fully connected neural networks with the feature pattern information associated with the occupant shape outputted from the convolutional neural networks.

Specifically, the convolutional neural networks may output a feature map representing the feature pattern information for the occupant image using kernels, and in this process, pooling and dropout may be performed on the occupant image.

Additionally, training may be conducted through back-propagation that compares the output results of the preprocessed dataset via the neural networks with the output results of training data via the neural networks, computes errors and gradually changes the weights of the neural networks.

That is, the feature pattern information associated with the occupant shape may be inputted to the fully connected neural networks, and the myocardial infarction diagnosis information may be outputted through the training.

For reference, referring to FIG. 10, the feature pattern information associated with the occupant shape may be outputted using the kernels from the occupant image using the convolutional neural networks, and the feature pattern information may be inputted to the fully connected neural networks and the corresponding myocardial infarction diagnosis information among myocardial infarction, cardiac arrest and stomach ulcer may be outputted.

According to an embodiment, in the case of the training, to detect if the specific object acquired from the occupant image is a human, and when the object is determined to be a human, to detect a disease from the shape of the occupant, the corresponding process may be implemented in detail.

Although the present disclosure uses CNN and FCNN as the neural networks, this is provided for illustration and also in the case where a variety of neural networks such as Deep Neural Network (DNN) or Recurrent Neural Network (RNN) are used, the present disclosure may be equally/similarly applied.

According to an embodiment, the control unit 10" may be incorporated into a software module or may be fabricated in the form of at least one hardware chip and mounted in the autonomous vehicle 1".

For example, the control unit 10" may be fabricated in the form of a dedicated hardware chip for artificial intelligence (AI) such as Neural Processing Unit (NPU), or may be fabricated as a portion of an existing general purpose processor (for example, CPU or Application Processor) or a dedicated graphics processor (for example, Graphic Processing Unit (GPU) or Visual Processing Unit (VPU)) and mounted in the autonomous vehicle 1".

When the occupant is diagnosed with myocardial infarction, the control unit 10" may generate the command that controls the autonomous vehicle 1" to self-drive to the hospital.

Specifically, the command that controls the self-driving to the hospital may control the operation unit 80" to allow the autonomous vehicle 1" to self-drive to the hospital.

According to an embodiment, the control unit 10" may control the autonomous vehicle 1" to self-drive to a hospital having available beds.

For example, the control unit 10" may transmit emergency condition information notifying that the myocardial infarction patient will be transported to the hospital by self-driving to a hospital management server (not shown) through the communication unit 90", receive information associated with the hospital having available beds from the hospital management server (not shown), and control the autonomous vehicle 1" to self-drive to the corresponding hospital.

Since a myocardial infarction is an extreme emergency in which there is a golden hour, if a patient with myocardial infarction is transported to a hospital having no available beds especially at nighttime, the patient wastes time and may miss the golden hour. According to the present disclosure, it may be possible to control the self-driving to the hospital having available beds to ensure that the patient has treatment within the golden hour.

According to another embodiment, the control unit 10" may control the autonomous vehicle 1" to self-drive to a hospital selected by another occupant among hospitals specializing myocardial infarction, hospitals having available beds and hospitals closest to the current location.

The storage unit 100" may pre-store a list of hospitals staffed by medical specialists who specialize in treating myocardial infarction.

According to an embodiment, the control unit 10" may transmit the emergency condition information notifying that the myocardial infarction patient will be transported to the hospital by self-driving to the hospital management server (not shown) through the communication unit 90", and receive information associated with hospitals having available beds at the current time from the hospital management server (not shown).

According to an embodiment, the control unit 10" may search for hospitals closest to the current location acquired from a location sensing unit (for example, GPS) and acquire information associated with the nearest hospitals.

The control unit 10" may provide another occupant with list information of various hospitals through the user interface unit 110", and control the autonomous vehicle 1" to self-drive to the hospital selected by the another occupant from the list information through the user interface unit 110".

According to an embodiment, the controlled self-driving to the user selected hospital may increase the autonomy of user selection, and when another occupant is, especially, the occupant's family member, he/she may be allowed to make the corresponding determination, thereby reducing the future dispute risks.

According to an embodiment, the control unit 10" may further diagnose the severity of myocardial infarction based on at least one of 1-1) whether the occupant grabs the chest with one hand or both hands, 2-1) the degree of facial contortion of the occupant, or 3-1) the extent to which the occupant's upper body leans at the predetermined angle or more in the occupant image.

That is, the control unit 10" may determine that the occupant has a myocardial infarction when the occupant image satisfies a predetermined criterion based on 1), 2) and 3), and then diagnose the severity of myocardial infarction based on at least one of 1-1), 2-1) or 3-1).

For example, when it is determined that the occupant grabs the chest with one hand and the degree of facial contortion of the occupant corresponds to about 70%, it may be diagnosed that the severity of myocardial infarction corresponds to the middle level.

In contrast, when it is determined that the occupant grabs the chest with both hands, the degree of facial contortion of the occupant corresponds to about 90% and the occupant's upper body leans at an angle close to 90°, it may be diagnosed that the severity of myocardial infarction corresponds to the top level.

According to an embodiment, the control unit 10" may control the autonomous vehicle to self-drive to the suitable hospital among a) hospitals specializing in myocardial infarction, b) hospitals having available beds and c) hospitals closest to the current location based on the myocardial infarction severity diagnosis result.

A process of acquiring the information of a), b) and c) is the same as described above.

For example, when the control unit 10" diagnoses that the severity of myocardial infarction of the occupant corresponds to the middle level, the control unit 10" may control the autonomous vehicle 1" to self-drive to the hospital specializing in myocardial infarction.

In contrast, when the control unit 10" diagnoses that the severity of myocardial infarction of the occupant corresponds to the top level, the control unit 10" may control the autonomous vehicle 1" to self-drive to the hospital having available beds or the nearest hospital.

That is, according to the present disclosure, since the appropriate hospital may be determined by the autonomous vehicle 1" according to the severity of myocardial infarction, it may be possible to ensure that the patient receives treatment in the best hospital for the patient's condition.

According to an embodiment, the control unit 10" may control the autonomous vehicle 1" to self-drive to the hospital with further reference to a matching ratio between the occupant's sound sensing result by the sound sensing unit 30" and a predetermined single-syllable moan sound pre-stored in the storage unit 100".

That is, when the single-syllable moan sound such as 'wooh', 'uhh', 'ahh' 'ohh' or the like is outputted through the sound sensing unit 30" together the occupant's image, the control unit 10" may control the autonomous vehicle 1" to self-drive to the hospital.

When the matching ratio of the single-syllable moan sound satisfies a predetermined criterion or more, the control unit 10" may control the autonomous vehicle 1" to self-drive to the hospital.

According to an embodiment, the control unit 10" may control the autonomous vehicle 1" to self-drive to the hospital with reference to the duration information of the single-syllable moan sound together with the matching ratio.

That is, only when the single-syllable moan sound lasts for the predetermined time, the control unit 10" may control the autonomous vehicle 1" to self-drive to the hospital.

According to the present disclosure, since the occupant's video information and audio information are used together to diagnose the myocardial infarction, it may be possible to further increase the diagnosis accuracy.

Embodiment 2

In the case of embodiment 2, the description of embodiment 1 may be equally/similarly applied.

Figure 11:
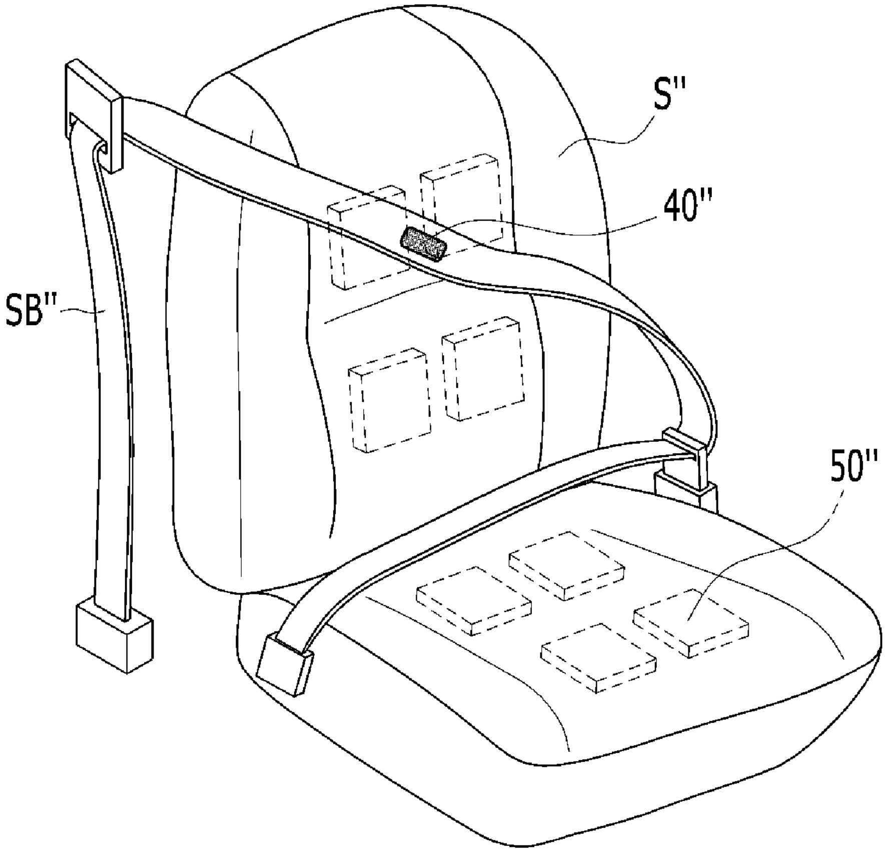
FIG. 11 is a reference drawing used to describe a heartbeat sensor 40" and a pressure sensor 50" according to an embodiment.

According to an embodiment, referring to FIG. 11 together, the control unit 10" may diagnose the myocardial infarction using the heartbeat sensor 40" embedded in a seat belt SB" of the autonomous vehicle 1" and the pressure sensor 50" embedded in a seat S" together.

Specifically, the heartbeat sensor 40" may be disposed at the seat belt SB", in particular, at a location corresponding to the heart location of the occupant.

The heartbeat sensor 40" may be embedded in the seat belt in the form of a chip or a patch.

According to an embodiment, the heartbeat sensor 40" does not operate (off) in normal situation, and only when the occupant is determined to lean to one side from information acquired from the pressure sensor 50", the heartbeat sensor 40" may operate (on).

Specifically, the pressure sensor 50" may be disposed in the same number at the left side and the right side on the basis of the center of the seat S", and may determine that the occupant leans to one side by comparing the magnitude of pressure detected from the left pressure sensor with the magnitude of pressure detected from the right pressure sensor.

That is, only when a difference between the magnitude of pressure detected from the left pressure sensor and the magnitude of pressure detected from the right pressure sensor is equal to or larger than a predetermined value, it may be determined that there is a tilt for the operation of the heartbeat sensor 40".

Meanwhile, the heartbeat sensor 40" is configured to measure the occupant's heart beats, and the heartbeat measurement may be performed by analyzing the occupant's ElectroCardioGram (ECG) signal detected from conductive electrodes of the heartbeat sensor 40".

Specifically, the myocardial infarction of the occupant may be diagnosed by comparing peak values of the currently measured ECG signal of the occupant and a preset reference ECG signal.

Alternatively, when a remarkable change in T wave or abnormal Q waves indicating myocardial necrosis are seen on the ECG, the myocardial infarction may be diagnosed.

According to an embodiment, when the occupant is determined to lean to one side, the heartbeat sensor 40" may operate with the seat belt SB" placed in close contact with the body of the occupant who gets undressed to measure the occupant's heart beats by the conductive electrodes of the heartbeat sensor 40".

According to an embodiment, a portion of the seat belt SB" corresponding to the chest location of the occupant may be made of a conductive material. That is, in particular, the seat belt SB" may be made of a conductive material at the location at which the heartbeat sensor 40" is embedded to allow an electric current to flow.

According to the present disclosure, since the heartbeat sensor 40" does not operate in normal situation and only when the extent to which the occupant leans to one side is equal to or larger than the predetermined threshold, the heartbeat sensor 40" operates, it may be possible to reduce power consumption, and since the amount of tilt and the heartbeat measurement result are used together to diagnose the myocardial infarction, it may be possible to further improve the precision in diagnosis.

Meanwhile, as described above in embodiment 1, also in the case of embodiment 2, when the control unit 10" diagnoses the occupant with myocardial infarction, the control unit 10" may control the autonomous vehicle 1" to self-drive to the hospital having available beds.

According to an embodiment, when the control unit 10" diagnoses the occupant with myocardial infarction, the control unit 10" may control the autonomous vehicle 1" to self-drive to the hospital selected by another occupant among hospitals specializing in myocardial infarction, hospitals having available beds and hospitals closest to the current location.

According to an embodiment, the control unit 10" may further diagnose the severity of myocardial infarction, and control the autonomous vehicle to self-drive to the appropriate hospital among hospitals specializing in myocardial infarction, hospitals having available beds and hospitals closest to the current location based on the myocardial infarction severity diagnosis result.

Specifically, the control unit 10" may diagnose the severity of myocardial infarction based on the heartbeat measurement result, and when it is diagnosed that the severity corresponds to the middle level, the control unit 10" may control the autonomous vehicle 1" to self-drive to the hospital specializing in myocardial infarction.

As a result of measuring the heart beats, when it is diagnosed that the severity of myocardial infarction corresponds to the top level, the control unit 10" may control the autonomous vehicle 1" to self-drive to the hospital having available beds or the nearest hospital.

Embodiment 3

In the case of embodiment 3, the description of embodiments 1 and 2 may be equally/similarly applied.

According to an embodiment, the control unit 10" may diagnose the myocardial infarction using the motion sensor 60" embedded in the seat belt SB" of the autonomous vehicle 1" and the pressure sensor 50" embedded in the seat S" together.

The motion sensor 60" may be embedded in the seat belt SB" in the form of a chip or a patch.

The motion sensor 60" may include an acceleration sensor and a gyro sensor to measure the occupant's motion level.

That is, the occupant's motion level may be measured using the leaning motion speed measurement result by the acceleration sensor and the leaning motion direction measurement result by the gyro sensor together.

Specifically, the occupant's motion level may be measured based on the motion speed measurement result based on rotational acceleration around each axis of X-axis, Y-axis and Z-axis directions.

According to an embodiment, as a result of measuring the motion level by the motion sensor 60", when the resulting value is equal to or larger than the predetermined criterion value for myocardial infarction diagnosis, the occupant may be diagnosed with myocardial infarction.

Meanwhile, the pressure sensor 50" may be disposed in the same number at the left side and the right side on the basis of the center of the seat S", and may determine that the occupant leans to one side by comparing the magnitude of pressure detected from the left pressure sensor with the magnitude of pressure detected from the right pressure sensor.

For example, only when a difference between the magnitude of pressure detected from the left pressure sensor and the magnitude of pressure detected from the right pressure sensor is equal to or larger than the predetermined criterion value, it may be determined that there is a tilt for myocardial infarction diagnosis.

That is, only when both the motion level measurement result and the body pressure measurement result of the occupant are equal to or larger than the predetermined criterion value, the occupant may be diagnosed with myocardial infarction.

When it is determined that any one of the two results does not reach the predetermined criterion value, the occupant may not be diagnosed with myocardial infarction.

According to the present disclosure, since the occupant is diagnosed with myocardial infarction only when both the motion sensor 60" measurement result and the pressure sensor 50" measurement result show that the occupant has a myocardial infarction, it may be possible to further improve the precision in diagnosis.

Meanwhile, as described above in embodiment 1, also in the case of embodiment 3, when the control unit 10" diagnoses the occupant with myocardial infarction, the control unit 10" may control the autonomous vehicle 1" to self-drive to the hospital having available beds.

According to an embodiment, when the control unit 10' diagnoses the occupant with myocardial infarction, the control unit 10' may control the autonomous vehicle 1" to self-drive to the hospital selected by another occupant among hospitals specializing in myocardial infarction, hospitals having available beds and hospitals closest to the current location.

According to an embodiment, the control unit 10" may further diagnose the severity of myocardial infarction, and control the autonomous vehicle to self-drive to the appropriate hospital among hospitals specializing in myocardial infarction, hospitals having available beds and hospitals closest to the current location based on the myocardial infarction severity diagnosis result.

Specifically, on the premise that both the motion level measurement result and the body pressure measurement result are equal to or larger than the predetermined criterion value (70%), when the motion and pressure measurement results are about 80%, the control unit 10" may determine that the severity is the middle level and control the autonomous vehicle 1" to self-drive to the hospital specializing in myocardial infarction.

In contrast, when the motion and pressure measurement results are about 95%, the control unit 10" may determine that the severity is the top level and control the autonomous vehicle 1" to self-drive to the hospital having available beds or the nearest hospital.

Embodiment 4

In the case of embodiment 4, the description of embodiments 1 to 3 may be equally/similarly applied.

According to an embodiment, the control unit 10" may diagnose the myocardial infarction using the motion sensor 60" and the radar sensor 70" embedded in the seat belt SB" of the autonomous vehicle 1" together.

For the motion sensor 60", the description of embodiment 3 may be equally/similarly applied.

That is, the occupant's motion level may be measured using the leaning motion speed measurement result by the acceleration sensor and the leaning motion direction measurement result by the gyro sensor together.

Additionally, as a result of measuring the motion level by the motion sensor 60", when the resulting value is equal to or larger than the predetermined criterion value for myocardial infarction diagnosis, the radar sensor 70" may be controlled to operate.

The radar sensor 70" may emit electromagnetic waves towards the chest of the occupant, and measure the electromagnetic waves reflected from the occupant.

To accurately emit the electromagnetic waves towards the chest of the occupant, the radar sensor 70" may be mounted on the inside ceiling of the autonomous vehicle 1" in a rotated state at a predetermined angle.

The control unit 10" may determine normal heart beats when the electromagnetic waves measured by the radar sensor 70" exhibit a normal waveform, and may determine the myocardial infarction when the electromagnetic waves exhibit an abnormal waveform such as ventricular tachycardia waveform or ventricular fibrillation waveform.

According to the present disclosure, since the radar sensor 70" does not operate in normal situation and only when the occupant's motion level is equal to or larger than the predetermined threshold, the radar sensor 70" operates, it may be possible to reduce power consumption and avoid the continuous exposure to electromagnetic waves, thereby reducing the occupant's body burden, and since the motion level and the heartbeat waveform are used together to diagnose the myocardial infarction, it may be possible to further improve the precision in diagnosis.

Meanwhile, as described above in embodiment 1, also in the case of embodiment 4, when the control unit 10" diagnoses the occupant with myocardial infarction, the control unit 10" may control the autonomous vehicle 1" to self-drive to the hospital having available beds.

According to an embodiment, when the control unit 10" diagnoses the occupant with myocardial infarction, the control unit 10' may control the autonomous vehicle 1" to self-drive to the hospital selected by another occupant among hospitals specializing in myocardial infarction, hospitals having available beds and hospitals closest to the current location.

According to an embodiment, the control unit 10" may further diagnose the severity of myocardial infarction, and control the autonomous vehicle to self-drive to the appropriate hospital among hospitals specializing in myocardial infarction, hospitals having available beds and hospitals closest to the current location based on the myocardial infarction severity diagnosis result.

Specifically, when the waveform of the electromagnetic waves indicates the myocardial infarction and it is diagnosed that the severity of myocardial infarction determined based on the amount of change and/or the speed of change in waveform corresponds to the middle level, the control unit 10" may control the autonomous vehicle 1" to self-drive to the hospital specializing in myocardial infarction.

When it is diagnosed that the severity of myocardial infarction corresponds to the top level, the control unit 10" may control the autonomous vehicle 1" to self-drive to the hospital having available beds or the nearest hospital.

Embodiment 5

Meanwhile, embodiment 5 may be carried out as below on the premise of the description of each of embodiments 1 to 4.

According to an embodiment, when the control unit 10" diagnoses the occupant with myocardial infarction, then the control unit 10" may generate the emergency condition information notifying that the autonomous vehicle 1" will self-drive to the hospital and transmit the emergency condition information to a traffic management server (not shown) through the communication unit 90".

Accordingly, the traffic management server (not shown) may generate a traffic light control command corresponding to the emergency condition information.

For example, the traffic management server (not shown) may identify the current location and path information of the autonomous vehicle 1" to identify traffic lights through which the autonomous vehicle 1" will pass soon on the path of the autonomous vehicle 1", and generate the command that controls the corresponding traffic lights to output a traffic signal for vehicles rather than a pedestrian signal for a predetermined time.

Meanwhile, the traffic management server (not shown) may generate the traffic light control command corresponding to the emergency condition information to control the traffic lights, and transmit traffic light control condition information to the autonomous vehicle 1".

The control unit 10" may control the autonomous vehicle 1" to self-drive to the hospital based on the traffic light control condition information. That is, the autonomous vehicle 1" may pass through the traffic lights on the path of the autonomous vehicle 1" fast without stopping at traffic signals.

Although the embodiments 1 to 5 show the combinations of specific sensors, this is provided by way of illustration, and different combinations of any sensors of the present disclosure may be used for myocardial infarction diagnosis.

The features, structures and effects described above in the embodiments are included in an embodiment of the present disclosure but not necessarily limited to only one embodiment. Further, regarding the features, structures and effects described in each embodiment, it is obvious to persons having ordinary skill in the field pertaining to the embodiments to combine or modify them in another embodiment. Accordingly, it should be interpreted that the scope of the present disclosure encompasses the description related to such combinations and modifications.

Although the present disclosure has been hereinabove described with regard to the embodiments, this is provided by way of illustration and not intended to limit the present disclosure, and persons having ordinary skill in the field pertaining to the present disclosure will understand that many other modifications and changes may be made without departing from the essential features of this embodiment. For example, modifications may be made to each element described in the embodiments. Additionally, it should be interpreted that differences related to such modifications and changes are included in the scope of the present disclosure defined in the appended claims.

According to the present disclosure, in the complex and noisy traffic situation, since the information indicating the emergency situation is provided to the pedestrian, it may be possible to allow the pedestrian to clearly determine and handle the emergency situation, thereby achieving more safe traffic system management.

According to the present disclosure, since the danger area is classified and set in advance and changed and recognized according to situations, it may be possible to enable the traffic light to identify the danger area more quickly and accurately.

In particular, since the danger area is differently changed and recognized depending on the color of light source and the type of object, it may be possible to identify the danger area more accurately.

Moreover, even though identification information is the same, the danger area may be differently recognized depending on the type of traffic light, and thus it may be possible to identify the danger area according to situations.

Additionally, accordingly, it may be possible to identify the object entering the danger area more quickly and output the alarm information at the optimal timing.

Since a myocardial infarction is an extreme emergency in which there is a golden hour, if a patient with myocardial infarction is transported to a hospital having no available beds, the patient wastes time and may miss the golden hour. According to the present disclosure, it may be possible to control the self-driving to the hospital having available beds to ensure that the patient has treatment within the golden hour.

The controlled self-driving to the user selected hospital may increase the autonomy of user selection, and when another occupant is especially the occupant's family member, he/she may be allowed to make the corresponding determination, thereby reducing the future dispute risks.

According to the present disclosure, since the appropriate hospital is determined by the autonomous vehicle 1" according to the severity of myocardial infarction, it may be possible to ensure that the patient may receive treatment in the best hospital for the patient's condition.

According to the present disclosure, since the occupant's video information and audio information are used together for myocardial infarction diagnosis, it may be possible to further increase the diagnosis accuracy.

According to the present disclosure, since the heartbeat sensor 40" does not operate in normal situation, and only when the extent to which the occupant leans to one side exceeds the predetermined threshold, the heartbeat sensor 40" operates, it may be possible to reduce power consumption, and since the amount of tilt and the heartbeat measurement result are used together for myocardial infarction diagnosis, it may be possible to further improve the precision in diagnosis.

According to the present disclosure, since the occupant is diagnosed with myocardial infarction only when both the motion sensor 60" measurement result and the pressure sensor 50" measurement result indicate that the occupant has a myocardial infarction, it may be possible to further improve the precision in diagnosis.

What is claimed is:

1. A traffic signal control device comprising:

a location determination unit configured to determine a location of an emergency vehicle; and a traffic light management unit configured to transmit a traffic signal control command to a traffic light controller, wherein the traffic signal control command controls an output of Don't walk information to a region displaying the Don't walk information in a pedestrian traffic light near the emergency vehicle, and controls an output of information indicating an emergency situation related to the emergency vehicle to a region surrounding the region displaying the Don't walk information-, based on information associated with an urgency level of the emergency vehicle, wherein the information indicating the emergency situation includes an icon representing the emergency vehicle, and a shape of the icon differs depending on a type of the emergency vehicle, and the icon is outputted by adjusting at least one of brightness, size, duration, number, and output speed with reference to the urgency level.

2. The traffic signal control device according to claim 1, wherein the traffic signal control command controls the output of audio information together.

3. The traffic signal control device according to claim 1, further comprising:

a terminal management unit to transmit the traffic signal control command to a terminal near the pedestrian traffic light.

4. A traffic signal control device comprising:

a location determination unit configured to determine a location of an emergency vehicle; and a signal control unit configured to transmit a traffic signal control command to a traffic light controller, wherein the traffic signal control command controls an output of Don't walk information and controls, based on information associated with an urgency level of the emergency vehicle, an output of information indicating an emergency situation related to the emergency vehicle, in an overlapping, manner to a region displaying the Don't walk information in a pedestrian traffic light near the emergency vehicle, wherein the information indicating the emergency situation includes an icon representing the emergency vehicle, and a shape of the icon differs depending on a type of the emergency vehicle, and the icon is outputted by adjusting at least one of brightness, size, duration, number, and output speed with reference to the urgency level.

5. A traffic signal control device comprising:

a location determination unit configured to determine a location of an emergency vehicle; and a signal control unit configured to transmit a traffic signal control command to a traffic light controller, wherein the traffic signal control command controls an output of Don't walk information to a first region of a region displaying the Don't walk information, and controls an output of information indicating an emergency situation related to the emergency vehicle to a second region of the region displaying the Don't walk information in a pedestrian traffic light near the emergency vehicle-, based on information associated with an urgency level of the emergency vehicle, wherein the information indicating the emergency situation includes an icon representing the emergency vehicle, and a shape of the icon differs depending on a type of the emergency vehicle, and the icon is outputted by adjusting at least one of brightness, size, duration, number, and output speed with reference to the urgency level.

* * * * *